US011862376B2

(12) United States Patent
Miyamoto

(10) Patent No.: US 11,862,376 B2
(45) Date of Patent: Jan. 2, 2024

(54) CORE FOR INDUCTOR COMPONENT, INDUCTOR COMPONENT, AND METHOD OF MANUFACTURING CORE

(71) Applicant: Murata Manufacturing Co., Ltd., Kyoto-fu (JP)

(72) Inventor: Masashi Miyamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 495 days.

(21) Appl. No.: 17/003,898

(22) Filed: Aug. 26, 2020

(65) Prior Publication Data

US 2021/0098173 A1 Apr. 1, 2021

(30) Foreign Application Priority Data

Sep. 26, 2019 (JP) ................................ 2019-175305

(51) Int. Cl.
*H01F 27/28* (2006.01)
*H01F 27/24* (2006.01)

(52) U.S. Cl.
CPC ......... *H01F 27/24* (2013.01); *H01F 27/2823* (2013.01)

(58) Field of Classification Search
CPC .... H01F 27/24; H01F 27/2823; H01F 27/255; H01F 27/306; H01F 41/0246; H01F 17/045; H01F 17/04; H01F 41/0206; H01F 2017/0093
See application file for complete search history.

(56) References Cited

U.S. PATENT DOCUMENTS

2012/0086534 A1* 4/2012 Wu ....................... H01F 17/045 336/83
2014/0070914 A1* 3/2014 Oki ..................... H01F 41/0206 336/233
2017/0294264 A1* 10/2017 Hashimoto ......... H01F 27/2823
2017/0338026 A1* 11/2017 Wu ....................... H01F 27/022
2019/0311836 A1* 10/2019 Wu ........................... H01F 3/08
2019/0385778 A1* 12/2019 Kusawake ............ H01F 27/324
2020/0211753 A1* 7/2020 Horie .................... H01F 27/292
2021/0090788 A1* 3/2021 Hasegawa ............. H01F 27/292

FOREIGN PATENT DOCUMENTS

CN 108242315 A 7/2018
JP H05-226156 A 9/1993
JP 2003-068549 A 3/2003
JP 2004-235372 A 8/2004
JP 2015-025189 A 2/2015
JP 2017-204595 A 11/2017
JP 2018-107248 A 7/2018

* cited by examiner

*Primary Examiner* — Mang Tin Bik Lian
(74) *Attorney, Agent, or Firm* — Studebaker & Brackett PC

(57) ABSTRACT

A winding core portion includes corner portions. The cross section of the winding core portion taken in a direction orthogonally intersecting the longitudinal axis thereof is a polygon having four corners or more. The interior angle of each corner between adjacent sides of the polygon is 90 degrees or more and less than 120 degrees (i.e., from 90 degrees to 120 degrees) on the cross section. At least one of the corner portions has a first round surface and a second round surface that are formed so as to protrude outward and are arranged adjacently to each other in a circumferential direction of the winding core portion.

14 Claims, 10 Drawing Sheets

CORE FOR INDUCTOR COMPONENT, INDUCTOR COMPONENT, AND METHOD OF MANUFACTURING CORE

CROSS-REFERENCE TO RELATED APPLICATION

This application claims benefit of priority to Japanese Patent Application No. 2019-175305, filed Sep. 26, 2019, the entire content of which is incorporated herein by reference.

BACKGROUND

Technical Field

The present disclosure relates to a core for an inductor component, an inductor component including the core, and a method of manufacturing the core, and in particular, relates to a shape of the winding core portion for holding a wire wound therearound.

Background Art

A wire wound type inductor component includes a core having a winding core portion for holding a wire wound therearound. The winding core portion has a cross section typically shaped like a circle, an ellipse, a quadrangle, or a hexagon. The winding core portion may have various other cross sectional shapes. For example, Japanese Unexamined Patent Application Publication No. 2018-107248 discloses a winding core portion having a cross sectional shape of a hexagon that is shaped generally like a quadrangle.

When a wire is relatively thick, for example, having a diameter of 100 μm or more, a problem may arise.

In the case of the winding core portion having a cross sectional shape of a circle or an ellipse, when a wire is wound around the winding core portion, the wire comes into contact with the entire circumferential surface of the winding core portion, and accordingly the wire can be wound around stably even if the wire is relatively thick, for example, having a diameter of 100 μm or more. However, when the wire is wound into multiple layers (e.g., two layers) with turns of the wire being aligned, the wire must be returned in the direction opposite to the proceeding direction of helical winding of the wire so that the wire can go up from the lower layer to the upper layer. In this case, it is difficult to cause the returning point of the wire to stay stably at a predetermined position on the circumference of the winding core portion. This results in unstable positioning of the transition portion of the wire from the lower layer to the upper layer, which causes unstable multi-layer winding. The unstable state of the winding occurs more noticeably when the wire is wound around the winding core portion in a manner of bank winding. In the bank winding, multi-layer winding portions, in which the wire is wound into two layers or more, are arranged on the winding core portion in the longitudinal direction thereof.

On the other hand, in the case of the winding core portion having a cross sectional shape of a quadrangle or a hexagon, in other words, having corner portions, the above problem may not occur. However, when a relatively thick wire (e.g., having a diameter of 100 μm or more) is wound around the winding core portion, the wire rises from the circumferential surface of the winding core portion at positions other than the corner portions, which reduces friction acting between the wire and the winding core portion. As a result, if the thick wire is wound in the bank winding, the turns of the wire in the lower layer tend to slip in the axial direction of the winding core portion, which makes it difficult to achieve stable bank winding.

In the above case, the problem is encountered when the wire having a diameter of 100 μm or more, for example, is wound in the multi-layer winding such as bank winding. In general, however, it is desirable that the wire be wound stably around the winding core portion irrespective of the diameter of the wire even when the multi-layer winding is not adopted.

SUMMARY

Accordingly, the present disclosure provides a core having a winding core portion around which a wire can be wound stably, an inductor component including the core, and a method of manufacturing the core.

According to preferred embodiments of the present disclosure, a core for holding a wire wound therearound to form an inductor component includes a winding core portion extending along the longitudinal axis of the core.

The winding core portion has a polygonal cross section that orthogonally intersects the longitudinal axis of the core, and the polygonal cross section has four corners or more. The winding core portion includes corner portions such that the corner portions have an interior angle of 90 degrees or more and less than 120 degrees (i.e., from 90 degrees to 120 degrees) on the polygonal cross section. At least one of the corner portions has a first round surface and a second round surface that are formed so as to protrude outward, and the first round surface and the second round surface are arranged adjacently to each other in a circumferential direction of the winding core portion.

Note that the polygon for the polygonal cross section may include not only a polygon defined by straight sidelines but also a polygon having rounded corners. The expression “the first round surface and the second round surface are arranged adjacently to each other” may include not only a case that the first round surface and the second round surface is in contact with each other but also a case that a portion is interposed between the first round surface and the second round surface and the portion may be other than an outward-protruding round portion, in other words, an inward-recessed round portion or a flat portion, for example.

The present disclosure is directed also to an inductor component that includes the above-described core. In this case, the core further includes a first flange disposed at a first axial end of the winding core portion and a second flange disposed at a second axial end of the winding core portion. The second axial end is opposite to the first axial end. The core further includes a first terminal electrode disposed at the first flange and a second terminal electrode disposed at the second flange.

According to preferred embodiments of the present disclosure, the inductor component includes the core and a wire. The wire is wound around the winding core portion with the wire being in contact with the first round surface and the second round surface formed at the at least one of the corner portions. The wire has a first end and a second end opposite to the first end, and the first end is connected to the first terminal electrode and the second end is connected to the second terminal electrode.

The present disclosure is also directed to a method of manufacturing the core. In the core to be manufactured, the winding core portion includes four corner portions that are a first corner portion, a second corner portion, a third corner portion, and a fourth corner portion. On the polygonal cross section, the first corner portion is positioned diagonally opposite to the third corner portion and the second corner portion is positioned diagonally opposite to the fourth corner portion. The first round surfaces and the second round surfaces are arranged circumferentially around the winding core portion in the following order the first round surface of the first corner portion, the second round surface of the first corner portion, the second round surface of the second corner portion, the first round surface of the second corner portion, the first round surface of the third corner portion, the second round surface of the third corner portion, the second round surface of the fourth corner portion, and the first round surface of the fourth corner portion.

The above-described core includes the four corner portions each having the interior angles of 90 degrees or more and less than 120 degrees (i.e., from 90 degrees to 120 degrees) on the cross section thereof, and the first corner portion is positioned diagonally opposite to the third corner portion and the second corner portion is positioned diagonally opposite to the fourth corner portion. However, this does not exclude a case in which the core includes one or more corner portions in addition to the first to fourth corner portions. The corner portions other than the first to fourth corner portions may or may not have an interior angle of 90 degrees or more and less than 120 degrees (i.e., from 90 degrees to 120 degrees).

According to preferred embodiments of the present disclosure, a method of manufacturing the core includes a step of providing a die, an upper punch, and a lower punch, a step of forming a compact by pressing a ceramic powder, the compact being formed into the core, a step of firing the compact, and a step of polishing the fired compact.

The step of forming the compact includes a step of pressing the ceramic powder filled in a cavity of the die by moving the upper punch and the lower punch closer to each other with the ceramic powder interposed therebetween.

Inside the cavity, the die includes a first molding face that serves to form a first side surface extending between the first corner portion and the second corner portion of the winding core portion and also includes a second molding face that serves to form a second side surface extending between the third corner portion and the fourth corner portion of the winding core portion.

The upper punch includes a third molding face that serves to form an upper surface extending between the first corner portion and the fourth corner portion of the winding core portion. At the first corner portion, the third molding face includes a face that serves to form a first shoulder that is a portion to be formed into the second round surface and a first concave face that serves to form the first round surface at a position inside the first shoulder. At the fourth corner portion, the third molding face also includes a face that serves to form a fourth shoulder that is a portion to be formed into the second round surface and a fourth concave face that serves to form the first round surface at a position inside the fourth shoulder.

The lower punch includes a fourth molding face that serves to form a lower surface extending between the second corner portion and the third corner portion of the winding core portion. At the second corner portion, the fourth molding face includes a face that serves to form a second shoulder that is a portion to be formed into the second round surface and a second concave face that serves to form the first round surface at a position inside the second shoulder. At the third corner portion, the fourth molding face also includes a face that serves to form a third shoulder that is a portion to be formed into the second round surface and a third concave face that serves to form the first round surface at a position inside the third shoulder.

The compact obtained by the step of forming the compact has the first shoulder and the first round surface that are formed at the first corner portion, the second shoulder and the first round surface that are formed at the second corner portion, the third shoulder and the first round surface that are formed at the third corner portion, and the fourth shoulder and the first round surface that are formed at the fourth corner portion. The step of polishing the fired compact includes a step of forming the second round surfaces respectively at the first shoulder, the second shoulder, the third shoulder, and the fourth shoulder by polishing the first shoulder, the second shoulder, the third shoulder, and the fourth shoulder.

In the cross-sectional shape of the winding core portion, the corner portions have an interior angle of 90 degrees or more and less than 120 degrees (i.e., from 90 degrees to 120 degrees). At at least one of the corner portions, the first round surface and the second round surface are formed adjacent to each other in the circumferential direction of the winding core portion. As a result, the first round surface and the second round surface can virtually provide a large round surface having a large curvature due to the side by side arrangement of the round surfaces.

Accordingly, even in the case in which a relatively thick wire having a diameter of, for example, 100 μm or more is wound around the winding core portion, the wire is bent readily so as to follow the corner portions but does not readily rise from other portions of the winding core portion. In addition, at the corner portions of the winding core portion, at which the first round surface and the second round surface are formed, the wire can be reliably brought into contact with the winding core portion at at least two positions, in other words, at the first round surface and the second round surface. This can increase friction between the wire and the winding core portion, which can stabilize the winding pattern and the position of the wire wound around the winding core portion.

Other features, elements, characteristics, and advantages of the present disclosure will become more apparent from the following detailed description of preferred embodiments of the present disclosure with reference to the attached drawings.

BRIEF DESCRIPTION OF THE DRAWINGS

FIG. 7A, FIG. 7B, and FIG. 7C are enlarged cross-sectional views illustrating a portion of a compact that has been fired, which corresponds to section F in FIG. 5, and are provided for explanation of the method of manufacturing the core of FIG. 2, in which FIG. 7A illustrates a state of the core before polishing, FIG. 7B illustrates a state of the core after polishing, and FIG. 7C illustrates another state of the core after polishing, which may occur in actual polishing;

DETAILED DESCRIPTION

An inductor component 1 according to a first embodiment of the present disclosure will be described with reference to FIGS. 1 to 4.

Figure 1:
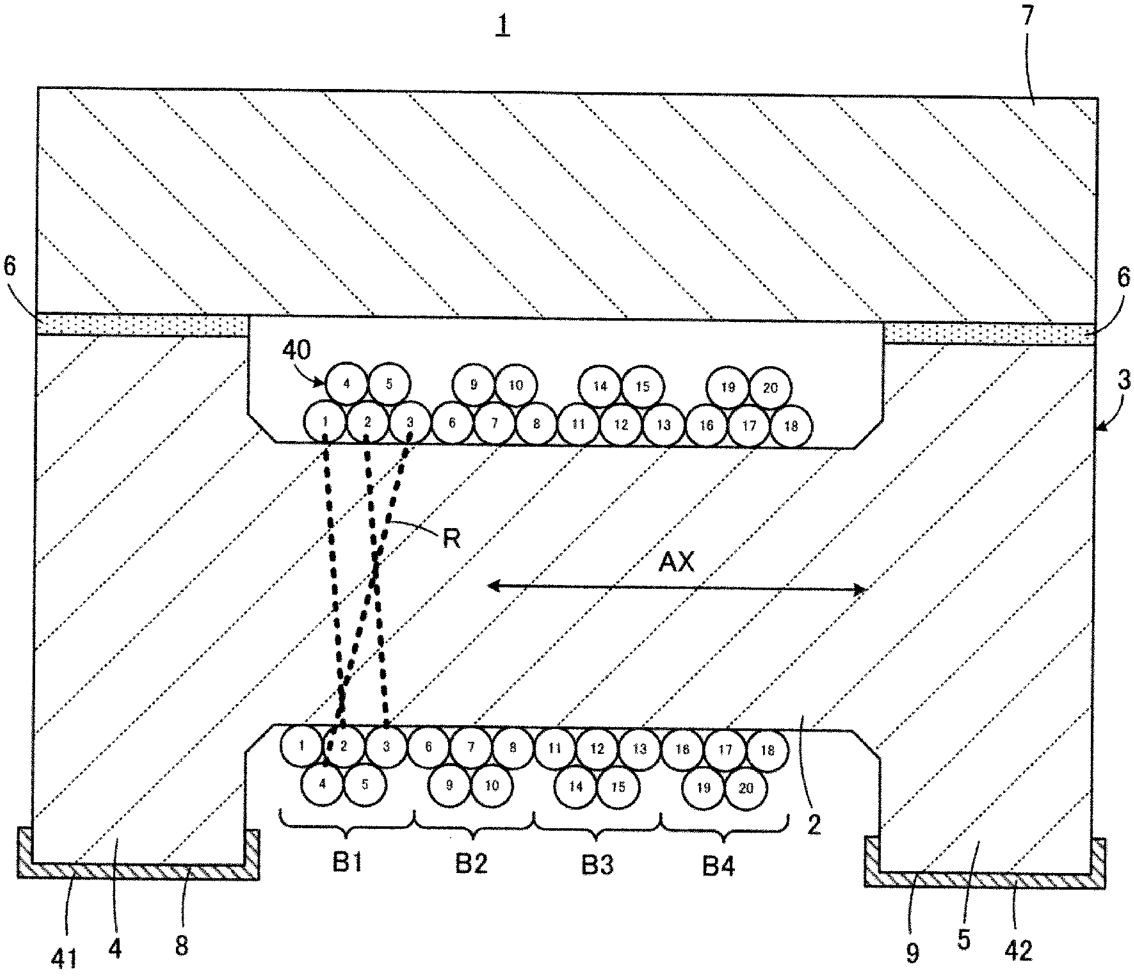
FIG. 1 is a cross-sectional front view illustrating an inductor component according to a first embodiment of the present disclosure.

As illustrated in FIG. 1, the inductor component 1 includes a core 3 having a winding core portion 2 that extends in an axial direction AX of the core 3. The core 3 is shaped like a drum and includes a first flange 4 formed at a first end of the winding core portion 2 in the axial direction AX and a second flange 5 formed at a second end of the winding core portion 2 that is opposite to the first end. When necessary, the inductor component 1 may also include a top plate 7 that is fixed to the core 3 by an adhesive 6 so as to span the first flange 4 and the second flange 5. The core 3 and the top plate 7 are sintered ceramic bodies made, for example, of ferrite or alumina. In the case of both of the core 3 and the top plate 7 being made of a magnetic substance, the core 3 and the top plate 7 form a closed magnetic circuit.

Figure 3:
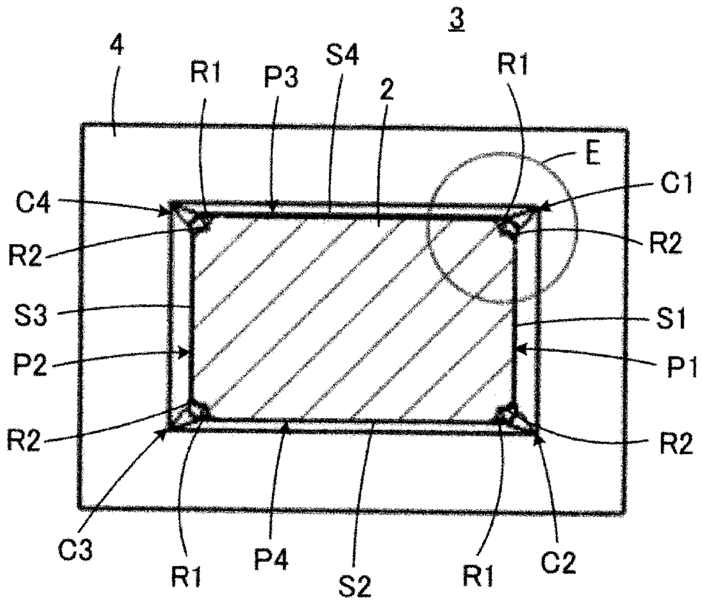
FIG. 3 is a cross section of the core of FIG. 2 taken along line A-A in FIG. 2.

As illustrated in FIG. 3, the winding core portion 2 of the core 3 has a cross section shaped substantially like a quadrangle. The cross section of the winding core portion 2 or the quadrangle has four sides S1 to S4, and interior angles between adjacent ones of the four sides are 90 degrees. The winding core portion 2 has four corner portions C1 to C4 each having an interior angle of 90 degrees on the quadrangular cross section.

Figure 4:
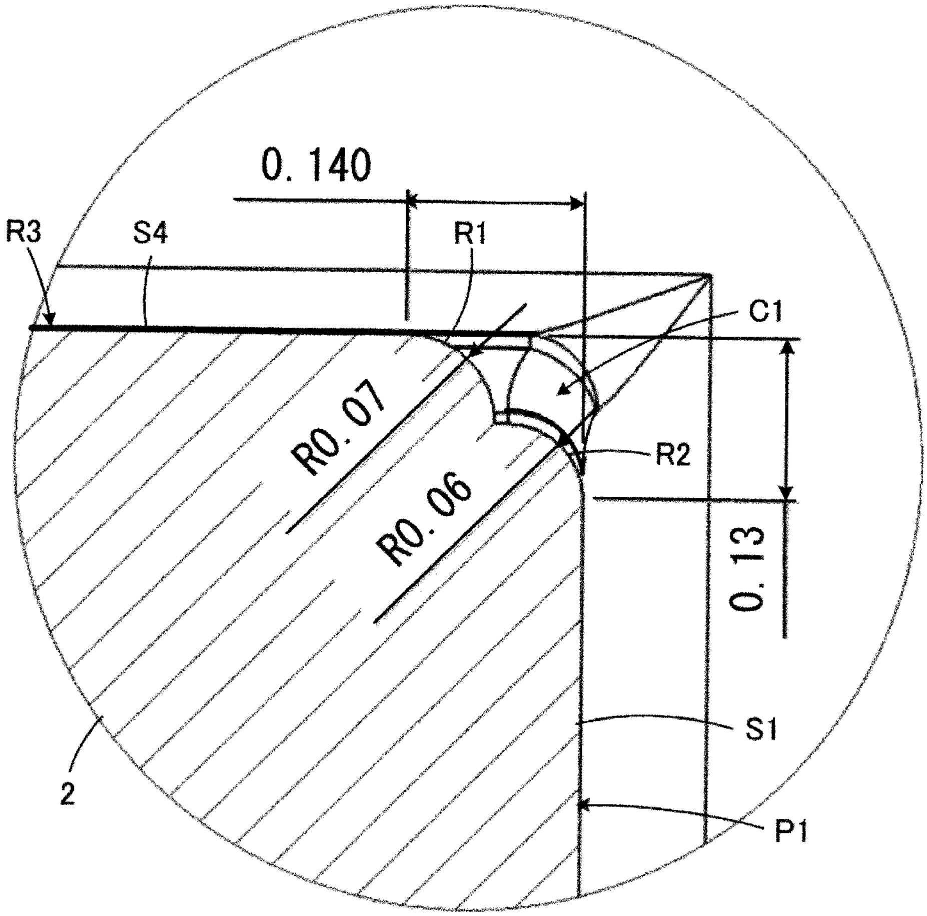
FIG. 4 is an enlarged cross-sectional view of section E in FIG. 3.

In each of the four corner portions C1 to C4, of which the corner portion C1 is illustrated in FIG. 4, a first round surface R1 and a second round surface R2 are formed and arranged adjacent to each other in the circumferential direction of the winding core portion 2. The first round surface R1 and the second round surface R2 are convexly formed so as to protrude outward. As illustrated in FIG. 3, of the four corner portions C1 to C4, the first corner portion C1 is positioned diagonally opposite to the third corner portion C3, and the second corner portion C2 is positioned diagonally opposite to the fourth corner portion C4. The first round surfaces R1 and the second round surfaces R2 are arranged circumferentially around the winding core portion 2 in the following order: the first round surface R1 of the first corner portion C1, the second round surface R2 of the first corner portion C1, the second round surface R2 of the second corner portion C2, the first round surface R1 of the second corner portion C2, the first round surface R1 of the third corner portion C3, the second round surface R2 of the third corner portion C3, the second round surface R2 of the fourth corner portion C4, and the first round surface R1 of the fourth corner portion C4. Note that dimensions in FIG. 4 are in millimeters.

In the cross-sectional shape of the winding core portion 2, the corner portions C1 to C4 have an interior angle of 90 degrees or more and less than 120 degrees (i.e., from 90 degrees to 120 degrees). At least one of the corner portions C1 to C4, the first round surface R1 and the second round surface R2 are formed adjacent to each other in the circumferential direction of the winding core portion 2. As a result, the first round surface R1 and the second round surface R2 can virtually provide a large round surface having a large curvature due to the side by side arrangement of the round surfaces.

Accordingly, when a wire 40 is wound around the winding core portion 2, which will be described later, the wire 40 is bent readily so as to follow the corner portions C1 to C4 but does not readily rise from other surface portions of the winding core portion 2 even if the wire 40 is relatively thick, for example, having a diameter of 100 μm or more. At the corner portions C1 to C4 of the winding core portion 2, at which the first round surface R1 and the second round surface R2 are formed, the wire 40 can be reliably brought into contact with the winding core portion 2 at at least two positions, in other words, at the first round surface R1 and the second round surface R2. This can increase friction between the wire 40 and the winding core portion 2, which can stabilize the winding pattern and the position of the wire 40 wound around the winding core portion 2.

The core 3 having the winding core portion 2 configured as above is preferably manufactured in the following manner.

Figure 5:
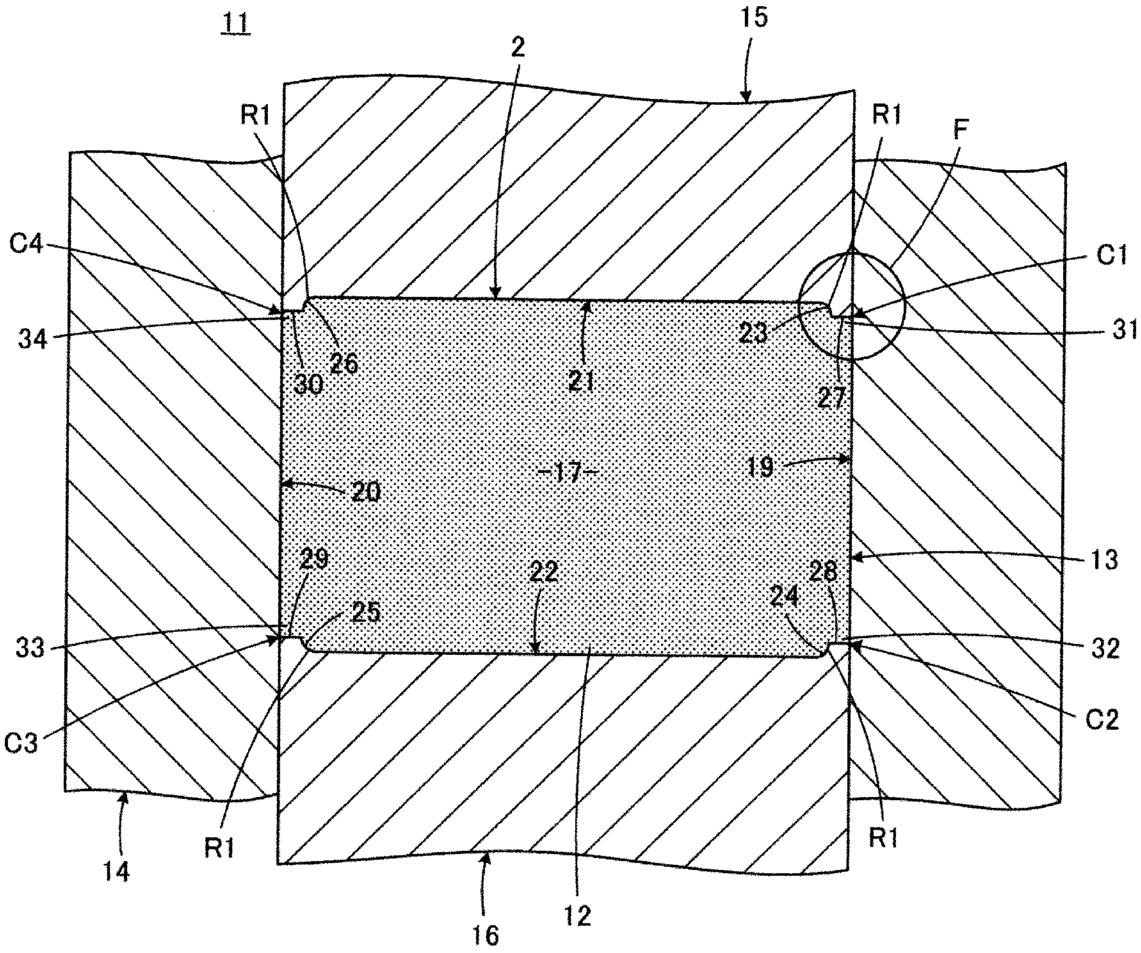
FIG. 5 is a cross-sectional view for explanation of a method of manufacturing the core of FIG. 2, illustrating a step of forming the core.
Figure 6:
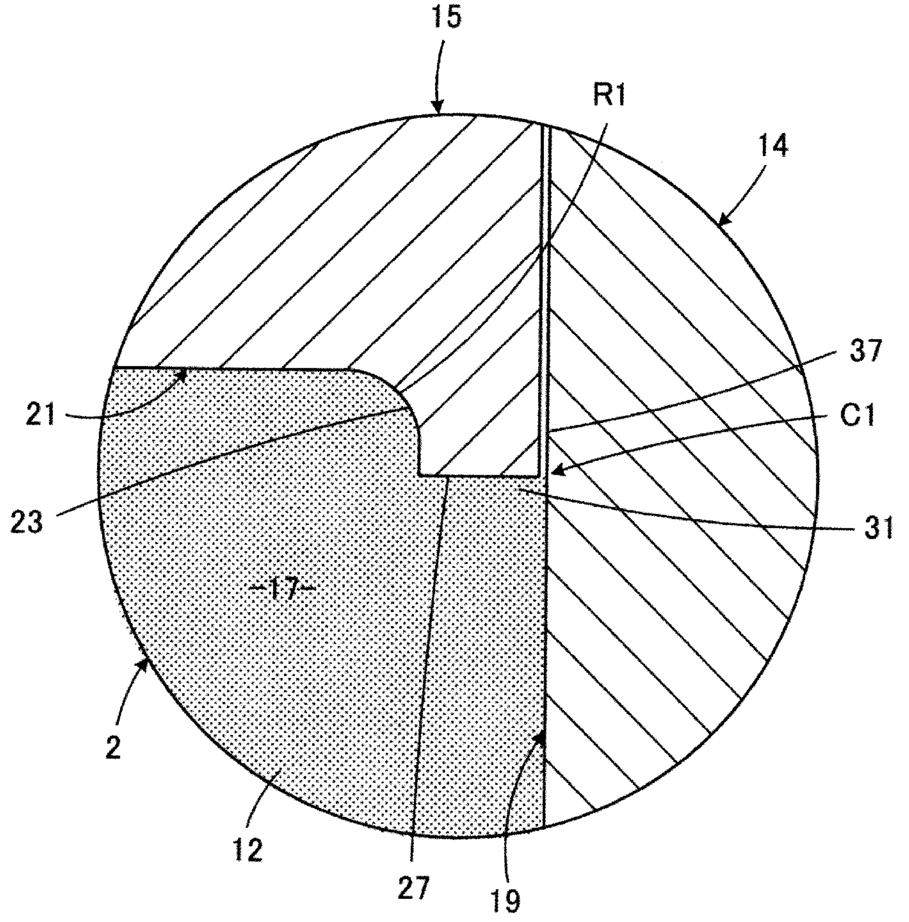
FIG. 6 is an enlarged cross-sectional view illustrating section F in FIG. 5.

A ceramic powder, which is the material for the core 3, is first prepared. The ceramic powder is processed to provide a compact in a forming step. The compact will be formed into the core 3 finally. FIG. 5 illustrates a major part of a molding apparatus 11 for carrying out the forming step, in other words, a part of the apparatus for forming the winding core portion 2. FIG. 5 is a cross section taken along line A-A in FIG. 2. FIG. 6 is an enlarged cross-sectional view illustrating section F in FIG. 5.

As illustrated in FIGS. 5 and 6, the molding apparatus 11 includes a die 14 that defines a cavity 13 into which the ceramic powder 14 is charged. In the cavity 13 of the die 14, an upper punch 15 and a lower punch 16 are disposed so as to oppose each other and are guided so as to move closer to or away from each other. The upper punch 15 and the lower punch 16 move closer to each other with the ceramic powder 12 interposed therebetween, thereby applying pressure to the ceramic powder 12 to form a compact 17 from which the core 3 is produced.

The compact 17 has a first shoulder 31 to be formed into the second round surface R2 at a position outside the first round surface R1 in the first corner portion C1. The compact 17 also has a second shoulder 32 to be formed into the second round surface R2 at a position outside the first round surface R1 in the second corner portion C2, a third shoulder 33 to be formed into the second round surface R2 at a position outside the first round surface R1 in the third corner portion C3, and a fourth shoulder 34 to be formed into the second round surface R2 at a position outside the first round surface R1 in the fourth corner portion C4.

The die 14 has a first molding face 19 and a second molding face 20 inside the cavity 13. The first molding face 19 serves to form a first side surface P1 having a first side S1 that extends between the first corner portion C1 and the second corner portion C2 of the winding core portion 2 on the cross section thereof (see FIG. 3). The second molding face 20 serves to form a second side surface P2 having a third side S3 that extends between the third corner portion C3 and the fourth corner portion C4 of the winding core portion 2 on the cross section thereof (see FIGS. 2 and 3).

Figure 2:
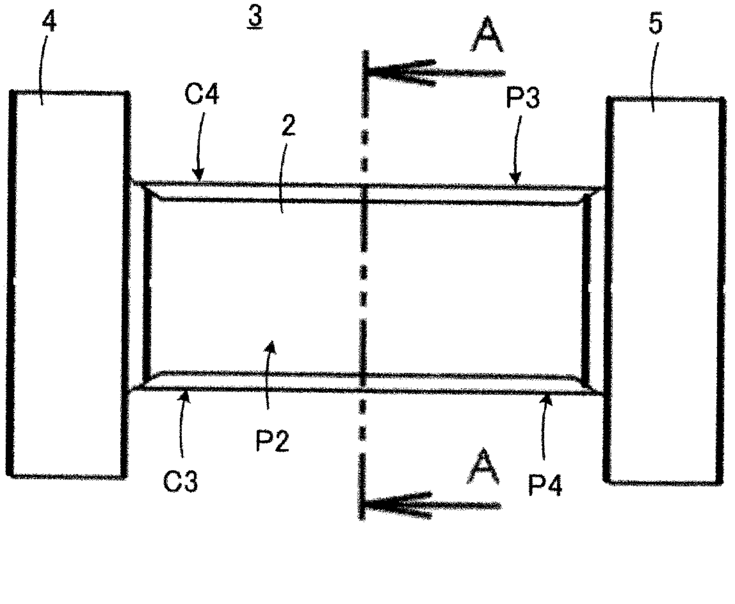
FIG. 2 is a front view of a core included in the inductor component of FIG. 1.

The upper punch 15 has a third molding face 21 that serves to form an upper surface P3 having a fourth side S4 that extends between the first corner portion C1 and the fourth corner portion C4 of the winding core portion 2 on the cross section thereof (see FIGS. 2 and 3).

The third molding face 21 has a first concave face 23 and a fourth concave face 26. The first concave face 23 serves to form the first round surface R1 at a position inside the first shoulder 31 in the first corner portion C1 of the winding core portion 2. The fourth concave face 26 serves to form the first round surface R1 at a position inside the fourth shoulder 34 in the fourth corner portion C4 of the winding core portion 2.

In the present embodiment, the third molding face 21 also has a first flat face 27 at a position outside the first concave face 23 and a fourth flat face 30 at a position outside the fourth concave face 26. The first flat face 27 serves to form the first shoulder 31 at a position outside the first round surface R1 in the first corner portion C1. The fourth flat face 30 serves to form the fourth shoulder 34 at a position outside the first round surface R1 in the fourth corner portion C4.

The lower punch 16 has a fourth molding face 22 that serves to form a lower surface P4 having a second side S2 that extends between the second corner portion C2 and the third corner portion C3 of the winding core portion 2 on the cross section thereof (see FIGS. 2 and 3).

The fourth molding face 22 has a second concave face 24 and a third concave face 25. The second concave face 24 serves to form the first round surface R1 at a position inside the second shoulder 32 in the second corner portion C2 of the winding core portion 2. The third concave face 25 serves to form the first round surface R1 at a position inside the third shoulder 33 in the third corner portion C3 of the winding core portion 2.

In the present embodiment, the fourth molding face 22 also has a second flat face 28 at a position outside the second concave face 24 and a third flat face 29 at a position outside the third concave face 25. The second flat face 28 serves to form the second shoulder 32 at a position outside the first round surface R1 in the second corner portion C2. The third flat face 29 serves to form the third shoulder 33 at a position outside the first round surface R1 in the third corner portion C3.

The forming step is carried out by using the above-configured die 14, upper punch 15, and lower punch 16, which produces the compact 17 in which the first round surfaces R1 are formed in respective corner portions of the winding core portion 2, in other words, the first corner portion C1, the second corner portion C2, the third corner portion C3, and the fourth corner portion C4. FIG. 5 illustrates a cross section of the winding core portion 2 of the compact 17 configured as above. FIG. 6 provides an enlarged view illustrating a portion of the compact 17.

Figure 7A:
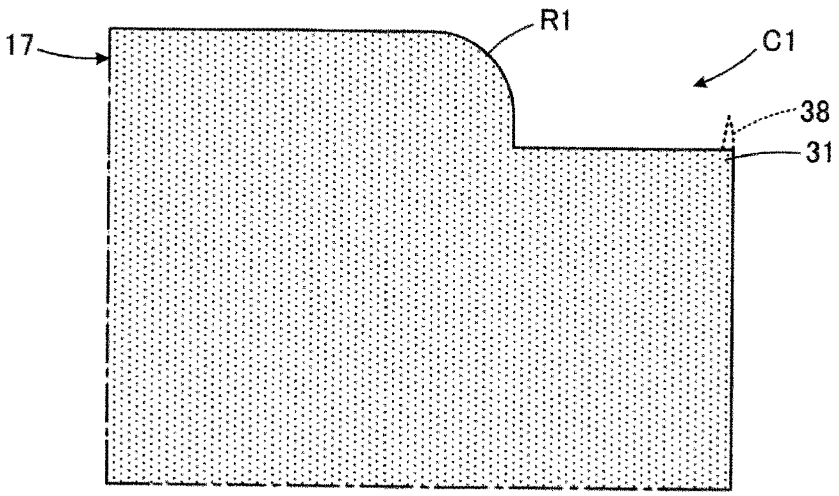

Next, the compact 17 is fired to sinter the ceramic powder 12. FIG. 7A is an enlarged view illustrating a portion of the compact 17 that has been fired, which corresponds to section F in FIG. 5. As illustrated in FIG. 7A, the first shoulder 31 is positioned next to the first round surface R1 in the first corner portion C1 of the winding core portion 2. The first shoulder 31 is a portion to be formed into the second round surface R2.

Figure 7B:
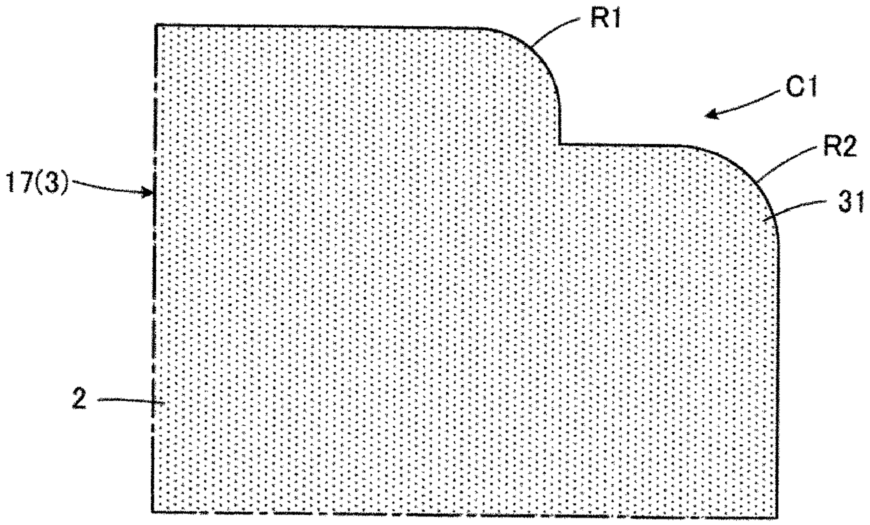

The compact 17 that has been fired is subjected to barrel finishing. As a result, as illustrated in FIG. 7B, the first shoulder 31 in the first corner portion C1 is polished into the second round surface R2. Similarly, in the step of barrel finishing, the second shoulder 32 of the second corner portion C2, the third shoulder 33 of the third corner portion C3, and the fourth shoulder 34 of the fourth corner portion C4 are polished into the second round surfaces R2.

The compact 17 obtained in the above forming step may have fins 38 (an example of a fin is indicated by the dotted line in FIG. 7A). The fins 38 are formed due to extra ceramic powder being extruded into gaps 37 between the die 14 and the upper and lower punches 15 and 16 (see FIG. 6). The fins 38 may protrude from at least one of edges of the first shoulder 31, the second shoulder 32, the third shoulder 33, and the fourth shoulder 34. In this case, the step of barrel finishing can also serve as a step of removing the fins 38.

Figure 7C:
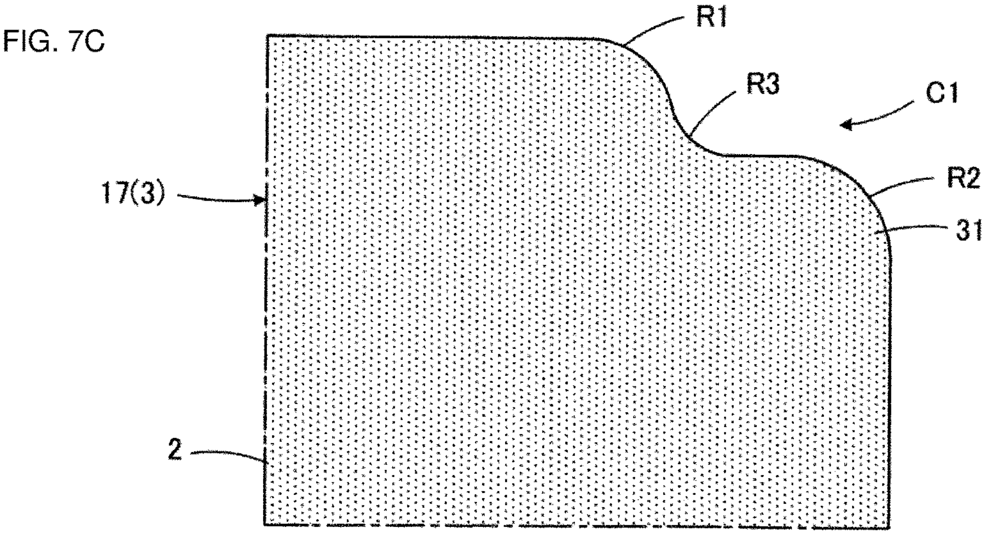

The core 3 is obtained after barrel finishing. After the step of barrel finishing, a third round surface R3 may often formed. As illustrated in FIG. 7C, the third round surface R3 is a concave surface formed between the first round surface R1 and the second round surface R2 as viewed from outside. The third round surface R3 typically has a curvature of 0.04 mm or more. Note that the third round surface R3 can be obtained also by way of design changes of the punches 15 and 16 used in the forming step.

The above description has been directed mainly to the first corner portion C1 of the winding core portion 2, in other words, the portion corresponding to section F in FIG. 5 in the compact 17 that has been fired. The second to fourth corner portions C2 to C4 of the winding core portion 2 are also subjected to the same processing as described with the first corner portion C1, and the detailed description will be omitted here.

In the embodiment described above, the barrel finishing is adopted in the polishing step. However, other polishing techniques, such as sand blasting or laser polishing, may be adopted.

Referring back to FIG. 1, the wire 40 is wound around the winding core portion 2. A manner of winding the wire 40 will be described later. The first flange 4 and the second flange 5 have respective bottom surfaces 8 and 9 that face a mounting substrate (not illustrated). A first terminal electrode 41 is formed on the bottom surface 8, and a second terminal electrode 42 is formed on the bottom surface 9. The terminal electrodes 41 and 42 are formed, for example, by baking an electroconductive paste, plating a conductive metal, or adhering a conductive metal piece. More specifically, a first end of the wire 40 is connected to the first terminal electrode 41, and a second end of the wire 40, which is an end opposite to the first end, is connected to the second terminal electrode 42 (these ends are not illustrated). For example, thermocompression bonding or welding can be used for the connection.

For example, the wire 40 is made of copper. The wire includes a central conductor having a circular cross section and an insulator coating that covers the central conductor. In the present description, the diameter of the wire refers to the diameter of the central conductor excluding the insulator coating.

FIG. 1 illustrates cross sections of turns of the wire 40. Turn numbers 1 to 20 appear on respective cross sections, which are the ordinary numbers designated to the turns from the first flange 4. The wire 40, which is wound around the winding core portion 2, has four aligned winding portions B1 to B4 each of which constitutes a bank winding portion (hereinafter referred to as "aligned bank winding portions B1 to B4").

The first aligned bank winding portion B1 is formed of the first to fifth turns of the wire 40 (hereinafter expressed as "the turn 1 to the turn 5"). In other words, the turns 1 to 3 of the wire 40 are positioned in a lower layer and wound helically around the winding core portion 2. The wire 40 is subsequently returned by approximately 1.5 turns and further wound around the winding core portion 2 in such a manner that the turn 4, which is a turn in an upper layer, fits in a recess formed by and between the turn 1 and the turn 2 of the lower layer, and the turn 5, which is another turn in the upper layer, fits in a recess formed by and between the turn 2 and the turn 3 with the exception of a returned wire portion R.

In the first aligned bank winding portion B1, the wire 40 goes up from the lower layer to the upper layer at a portion of the wire 40 between the turn 3 and the turn 4 where the wire 40 wound around the winding core portion 2 is returned in a direction opposite to the proceeding direction of the winding. Accordingly, this portion of the wire 40 is referred to as the "returned wire portion R". The helical winding of the wire 40 is somewhat disturbed at the returned wire portion R. In the present embodiment, the returned wire portion R occurs at a predetermined position on the circumference of the winding core portion 2, for example, at a position on the first side surface P1 having the side S1 on the cross section of the winding core portion 2 (see FIG. 3). In other words, the returned wire portion R starts at the first corner portion C1 and ends at the second corner portion C2.

A second aligned bank winding portion B2 is formed of the turn 6 to the turn 10 of the wire 40. After the wire 40 forms the turn 5, which is the last turn in the upper layer in the first aligned bank winding portion B1, the wire 40 goes down to the next lower layer and is wound around the winding core portion 2 to form the turn 6 to the turn 8. The wire 40 is subsequently returned by approximately 1.5 turns and is further wound around the winding core portion 2 in such a manner that the turns 9 and 10 in the upper layer fit in recesses formed by and between adjacent ones of the turns 6 to 8 in the lower layer with the exception of a returned wire portion. Here, the returned wire portion also occurs at a position on the first side surface P1 having the side S1 on the cross section of the winding core portion 2 (see FIG. 3).

The third aligned bank winding portion B3 and the fourth aligned bank winding portion B4 are formed similarly to the first aligned bank winding portion B1 and the second aligned bank winding portion B2, and the detailed description is omitted here.

Regarding the wire 40 wound around the winding core portion 2, especially regarding the wire 40 in the lower layer, the present inventors have obtained the following knowledge through experiments and experiences.

As the wire becomes thick, the rigidity of the wire increases, which makes it more difficult to bend the wire. This leads to difficulty in winding the wire without the wire rising from the circumferential surface of the winding core portion. However, there must exist an appropriate relation between the diameter of the wire and the curvature of corner portions of the winding core portion, with which the wire can be wound around the winding core portion without rising from the circumferential surface. The study based on this assumption has revealed that when the corner portions of the winding core portion have round surfaces with a curvature of 0.75 times or more of the wire diameter, the wire can be wound around the winding core portion without rising from the circumferential surface.

If the curvatures of the corner portions are too large, the cross-sectional shape of the winding core portion becomes more like a circle or an ellipse. In this case, the problem occurs in the bank winding in the aligned manner as described previously. The wire can be wound around stably in the lower layer, but it becomes difficult to stably position the starting point of the returned wire portion R on the circumference of the winding core portion. The starting point of the returned wire portion R is the position at which the wire is returned in the direction opposite to the proceeding direction of the winding so that the wire can go up from the lower layer to the upper layer. Thus, the preferable curvature of the corner portions has an upper limit, which is found to be twice as great as the diameter of the wire.

In summary, when the relation between the diameter D of the wire and the curvature r of each corner portion of the winding core portion satisfies $0.75D \leq r \leq 2D$, the wire can be wound around the winding core portion without rising from the circumferential surface thereof, in other words, with the wire being in contact with the circumferential surface. At the same time, this enables the returned wire portion R of the aligned bank winding to stay stably at the predetermined position on the circumferential surface of the winding core portion.

Figure 8A:
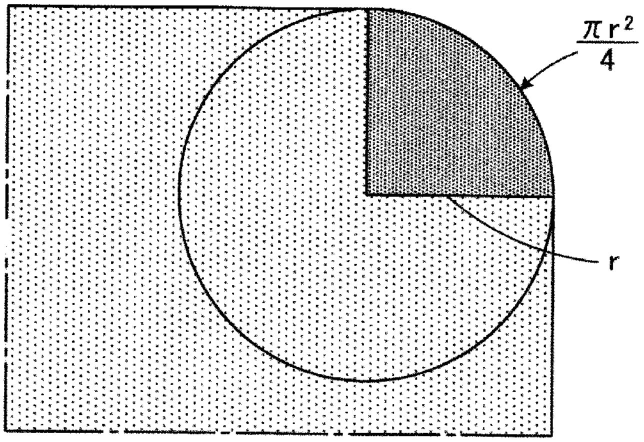
FIG. 8A and FIG. 8B are views illustrating a portion of the core, which corresponds to section F in FIG. 5, and are provided for explanation of a method of obtaining a virtual curvature of the portion in which a first round surface and a second round surface are positioned adjacent to each other.
Figure 8B:
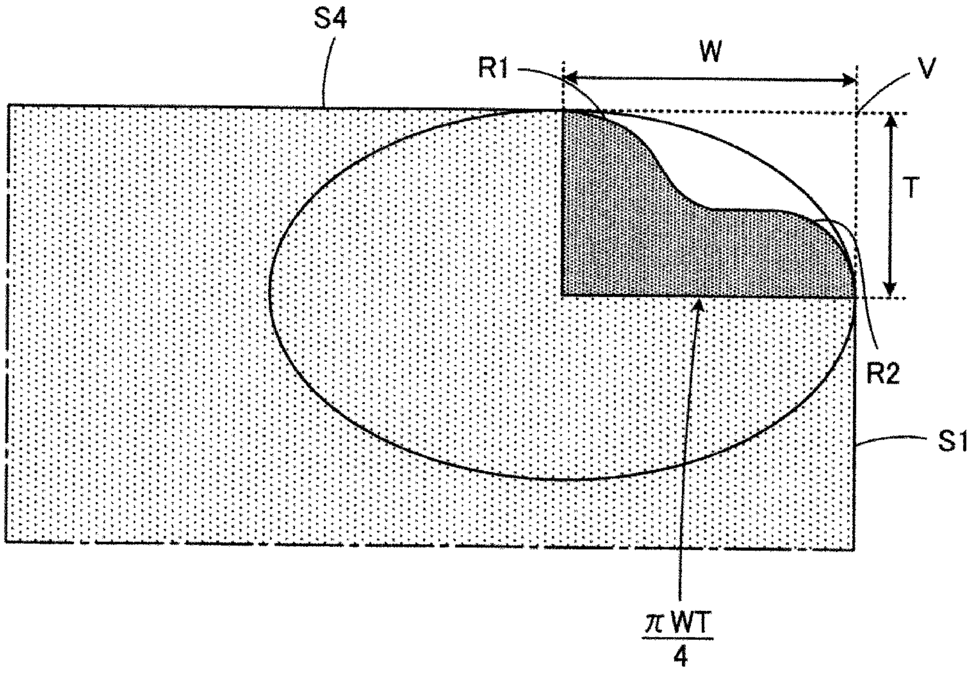

In the present embodiment, each of the corner portions C1 to C4 of the winding core portion 2 forms circumferentially arranged two round surfaces, in other words, the first round surface R1 and the second round surface R2, instead of forming one simple round surface. In this case, a virtual curvature of each of the corner portions C1 to C4 of the winding core portion 2 is obtained in the following manner. FIG. 8A illustrates a quarter circle having a radius of r. The area of the quarter circle is obtained from $\pi \cdot r^2/4$. FIG. 8B illustrates a quarter ellipse that encompasses the first round surface R1 and the second round surface R2, in which W denotes a half of the major axis and T denotes a half of the minor axis. The area of the quarter ellipse is obtained from $\pi \cdot W \cdot T/4$. When the area of the quarter circle is equal to the area of the ellipse, in other words, $\pi \cdot r^2/4 = \pi \cdot W \cdot T/4$, r is regarded as the virtual curvature of each of the corner portions C1 to C4 of the winding core portion 2. From this equation, $r^2 = W \cdot T$ is obtained. Accordingly, the virtual curvature r of each of the corner portions C1 to C4 of the winding core portion 2 can be obtained from $r = (W \cdot T)^{0.5}$.

Even if the wire is relatively thick, for example, having a diameter of 100 μm or more, the wire can be wound without rising from the circumferential surface of the winding core portion if the virtual curvature $(W \cdot T)^{0.5}$ is set to be at least 0.75 times greater than the diameter of the wire. In other words, when the diameter of the wire is denoted by D, the virtual curvature $(W \cdot T)^{0.5}$ at least satisfies $0.75D \leq (W \cdot T)^{0.5}$.

At the same time, when the wire is wound into the aligned bank winding portion, it is necessary to stabilize the starting point of the wire at which the wire is returned in the direction opposite to the proceeding direction of the winding in order to go up from the lower layer to the upper layer. In order to enable the starting point of the wire to stay at a predetermined position on the circumference of the winding core portion, the virtual curvature $(W \cdot T)^{0.5}$ is set to be twice or less of the diameter of the wire. In other words, when the diameter of the wire is denoted by D, the virtual curvature $(W \cdot T)^{0.5}$ satisfies $(W \cdot T)^{0.5} \leq 2D$.

Taken the above together, the relation between the wire diameter D and the virtual curvature $r=(W \cdot T)^{0.5}$ of each corner portion of the winding core portion at least satisfies $0.75D \leq (W \cdot T)^{0.5}$ 2D.

Under this condition, the lower-layer turns of the wire 40 cannot slip easily in the axial direction of the winding core portion 2 when the wire 40 is wound into the bank winding. In addition, the starting point of the wire 40, at which the wire 40 is returned in the direction opposite to the proceeding direction of helical winding of the wire so that the wire 40 can go up from the lower layer to the upper layer, can be easily stabilized at the predetermined position on the circumference of the winding core portion 2. Thus, stable bank winding can be carried out.

In FIG. 8B, reference sign W denotes the distance from a virtual point of intersection V of virtual extensions of adjacent sides (e.g., the fourth side S4 and first side S1) to one of the adjacent sides (e.g., the fourth side S4), and reference sign T denotes the distance from the virtual point of intersection V to the other one of the adjacent sides (e.g., the first side S1).

Note that although the relation between W and T is W>T in the present embodiment as illustrated in FIG. 8B, the relation between W and T may be W<T or W=T.

In the present embodiment, as illustrated in FIG. 4, a curvature r1 of the first round surface R1 is greater than a curvature r2 of the second round surface R2. However, the size relation between the curvature r1 and the curvature r2 may be opposite, or the curvature r1 may be equal to the curvature r2.

The above-described distances W and T and curvatures r1 and r2 can be adjusted appropriately by changing the design of the punches 15 and 16 used in the forming step or by changing the extent of polishing in the polishing step.

The following describes the second to the fifth embodiments of the present disclosure with reference to FIGS. 9A to 9C to FIGS. 12A to 12C, respectively. These figures correspond to FIGS. 7A to 7C. In FIGS. 9A to 9C to FIGS. 12A to 12C, the elements corresponding to those illustrated in FIGS. 7A to 7C are denoted by the same reference signs, thereby omitting duplicated description. Note that the following description focuses on the first corner portion C1 of the winding core portion 2 and omits description of the second to fourth corner portions C2 to C4 of the winding core portion 2 since they have the same configuration as that of the first corner portion C1.

Figure 9A:
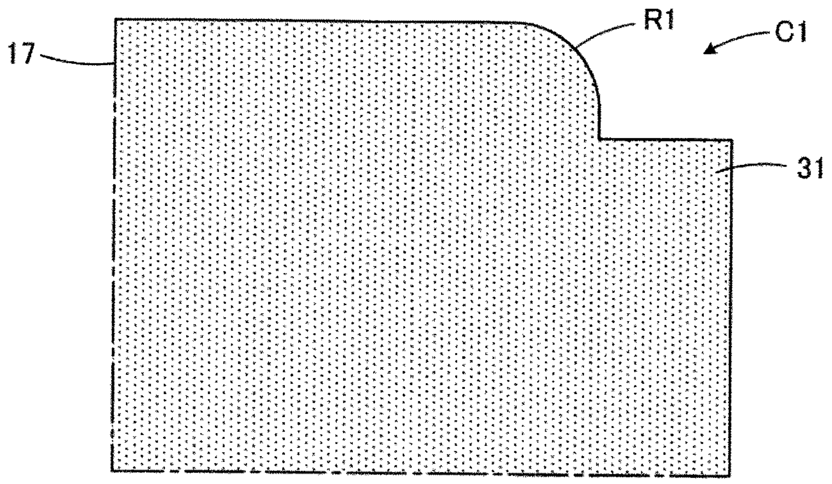
FIG. 9A, FIG. 9B, and FIG. 9C are views for explanation of a second embodiment of the present disclosure, which correspond to respective views of FIG. 7A, FIG. 7B, and FIG. 7C.
Figure 9B:
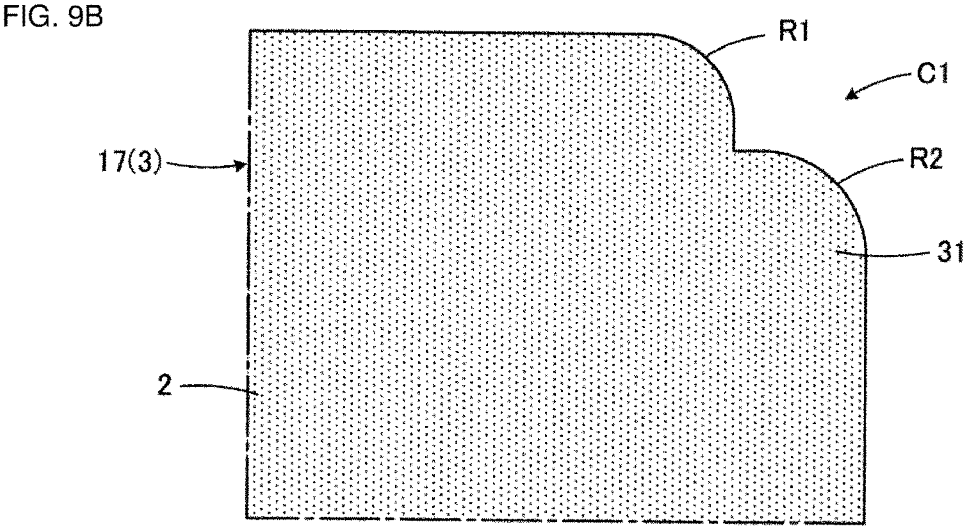
Figure 9C:
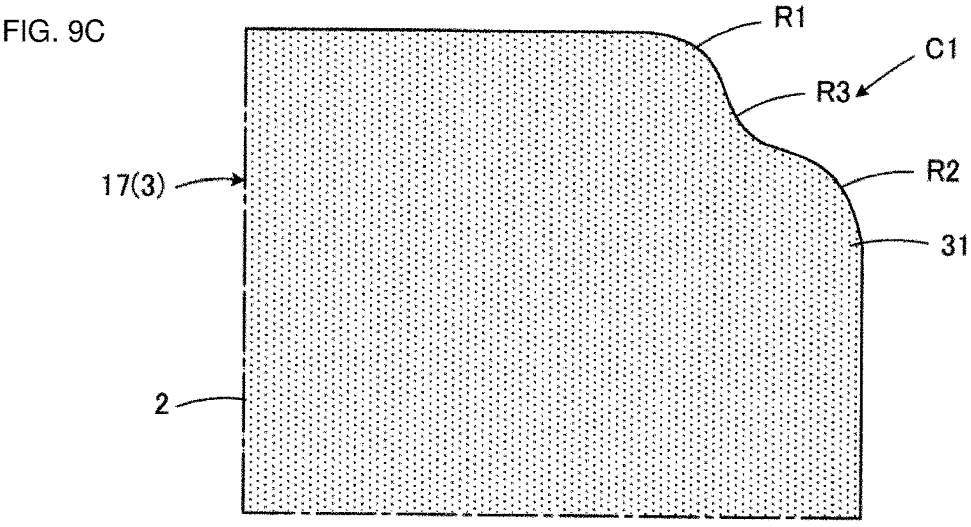

The embodiment illustrated in FIGS. 9A to 9C is different from that illustrated in FIGS. 7A to 7C. In the embodiment illustrated in FIGS. 7A to 7C, a relatively wide flat portion remains on the upper surface of the shoulder 31 after polishing, which is shown especially in FIG. 7B. In the embodiment illustrated in FIGS. 9A to 9C, however, there remains almost no flat portion on the upper surface of the shoulder 31 after polishing, which is shown especially in FIG. 9B.

Note that it is difficult to specify an upper limit of size of the flat surface remaining on each upper surface of the shoulders 31 to 34 between respective first and second round surfaces R1 and R2 since the border of the flat surface is not necessarily distinctive. Tentatively, however, the upper limit of size of the flat surface may be set to be equal to the virtual curvature $(W \cdot T)^{0.5}$ of the corner portions C1 to C4 or to be equal to the curvature of the first round surface R1.

Figure 10A:
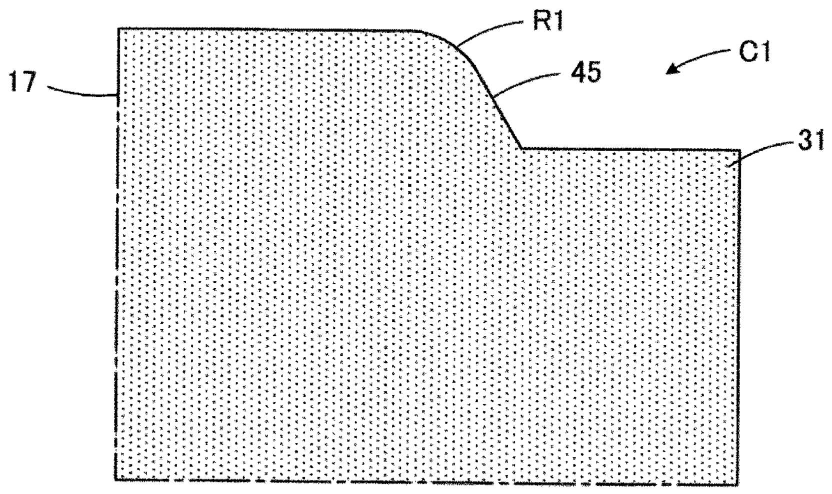
FIG. 10A, FIG. 10B, and FIG. 10C are views for explanation of a third embodiment of the present disclosure, which correspond to respective views of FIG. 7A, FIG. 7B, and FIG. 7C.
Figure 10B:
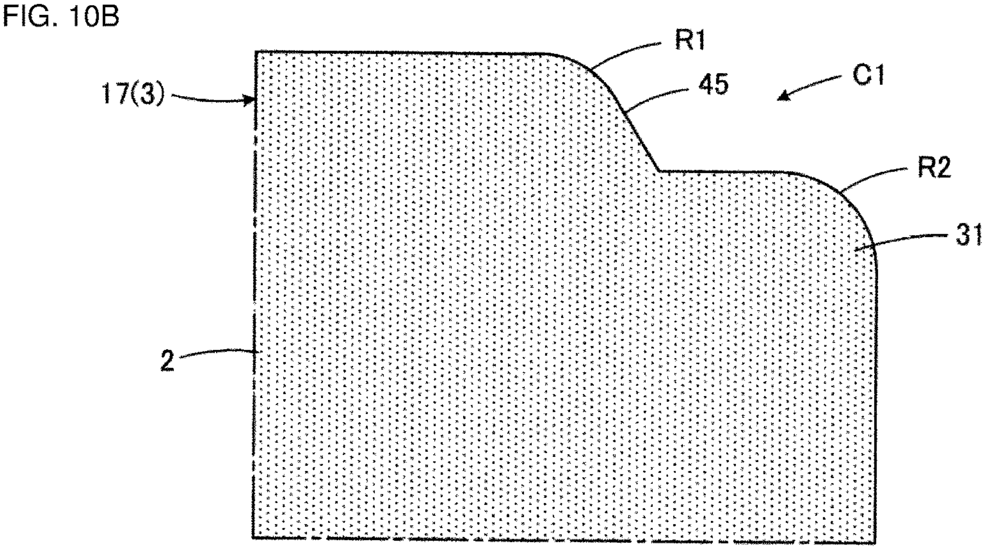
Figure 10C:
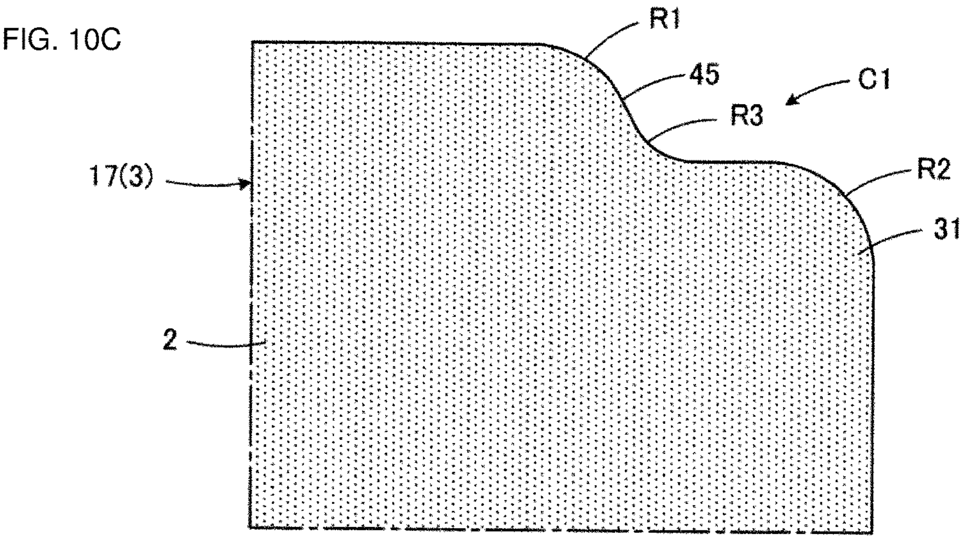

In the embodiment illustrated in FIGS. 10A to 10C, a slope 45 is formed in the forming step so as to extend from the first round surface R1 to the shoulder 31, which is shown especially in FIGS. 10A and 10B. In addition, as illustrated in FIG. 10B, a relatively wide flat portion remains on the upper surface of the shoulder 31 after polishing.

Figure 11A:
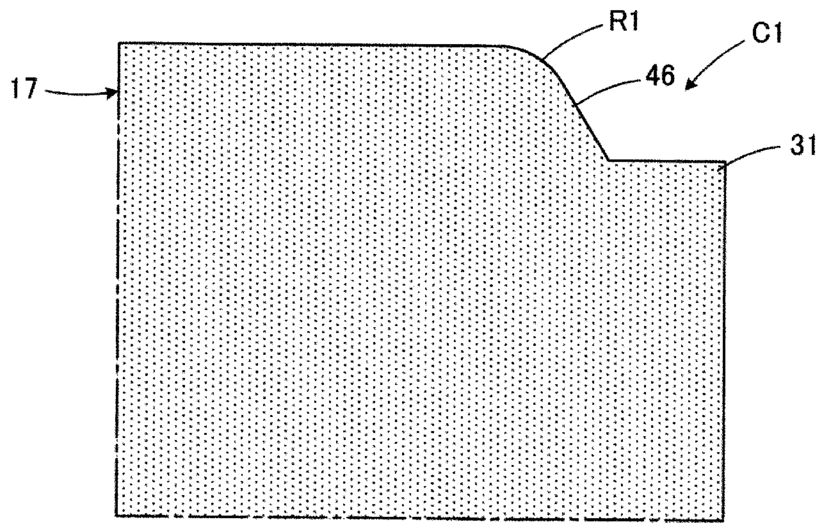
FIG. 11A, FIG. 11B, and FIG. 11C are views for explanation of a fourth embodiment of the present disclosure, which correspond to respective views of FIG. 7A, FIG. 7B, and FIG. 7C.
Figure 11B:
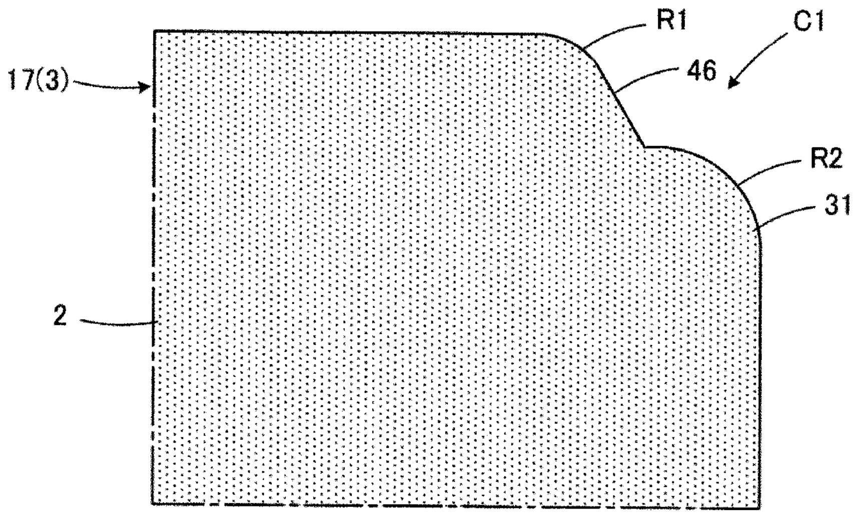
Figure 11C:
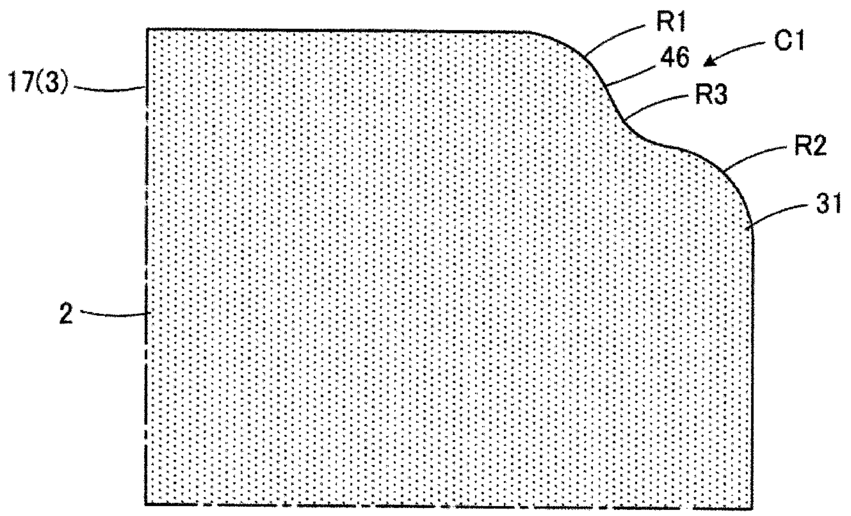

In the embodiment illustrated in FIGS. 11A to 11C, a slope 46 is formed in the forming step so as to extend from the first round surface R1 to the shoulder 31, which is shown especially in FIGS. 11A and 11B. In addition, as illustrated especially in FIG. 11B, there remains almost no flat portion on the upper surface of the shoulder 31 after polishing.

Figure 12A:
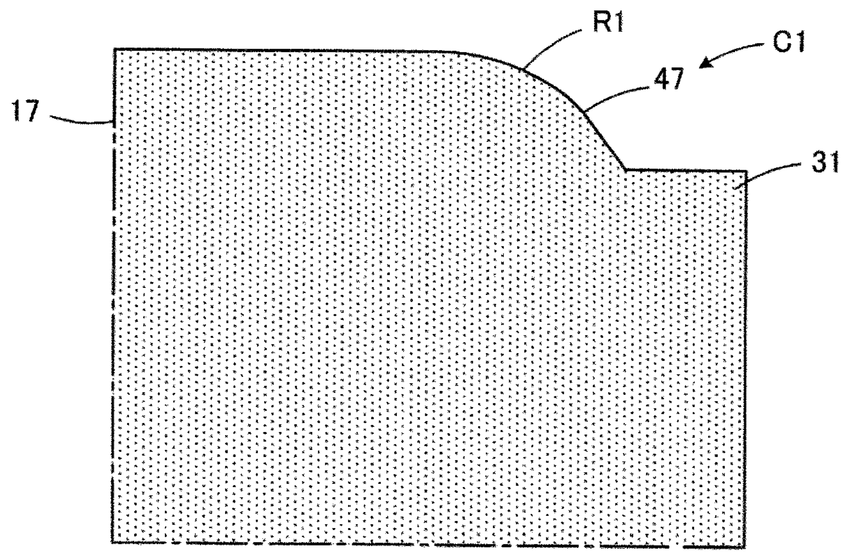
FIG. 12A, FIG. 12B, and FIG. 12C are views for explanation of a fifth embodiment of the present disclosure, which correspond to respective views of FIG. 7A, FIG. 7B, and FIG. 7C.
Figure 12B:
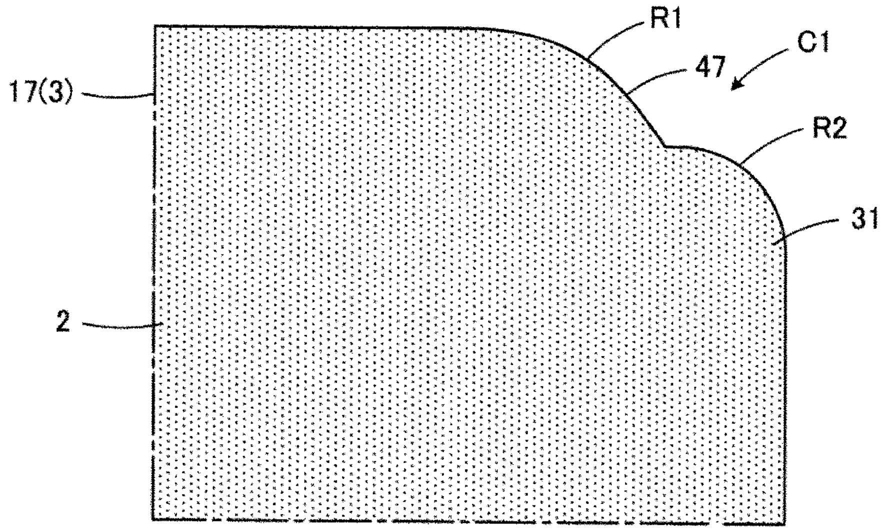
Figure 12C:
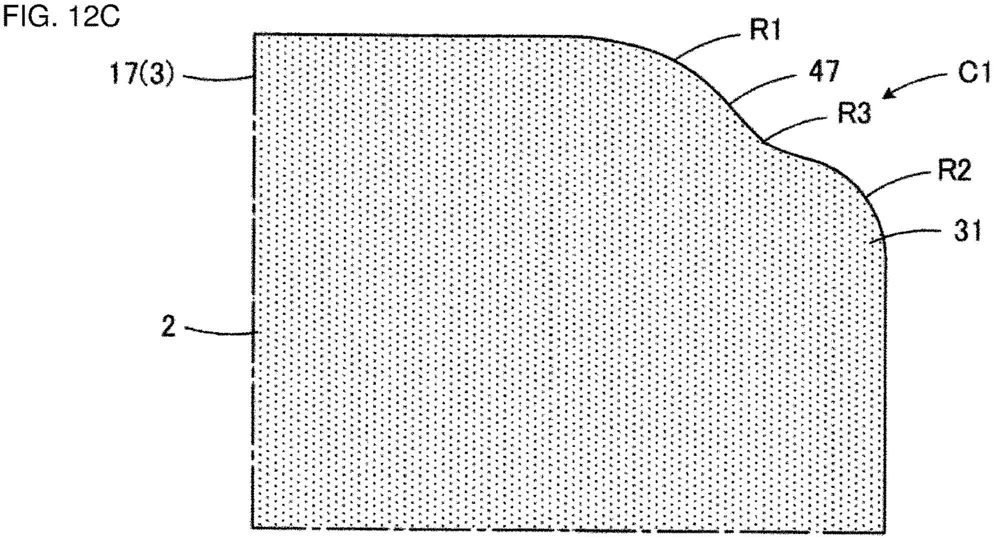

In the embodiment illustrated in FIGS. 12A to 12C, as are the cases illustrated in FIGS. 10A to 10C and in FIGS. 11A to 11C, a slope 47 is formed so as to extend from the first round surface R1 to the shoulder 31, which is shown especially in FIGS. 12A and 12B. In this embodiment, however, the slope 47 is integrated into the first round surface R1.

The second to fifth embodiments described above can be implemented by changing the design of the punches 15 and 16 used in the forming step.

The embodiments of the present disclosure have been described with reference to the drawings. The embodiments illustrated are examples and are changeable in various ways.

For example, in the case of the winding core portion having the quadrangular cross section, the first round surface and the second round surface, which are a characteristic part of the disclosure, may be formed only in a single corner portion instead of being formed in all of the four corner portions. This configuration can also provide the advantageous effect that the wire can be wound around stably. Accordingly, it is sufficient that the first round surface and the second round surface are formed at at least one corner portion.

Moreover, round surfaces having different curvatures, instead of the round surfaces having the same curvature, may be formed at different corner portions.

In the embodiments illustrated, the winding core portion having a quadrangular cross section has been described, by way of example, as having an interior angle of 90 degrees between adjacent ones of four sides on the cross section. However, the present disclosure can be applied to a winding core portion of a core having a polygonal cross section with four corners or more at which the interior angles are 90 degrees or more and less than 120 degrees (i.e., from 90 degrees to 120 degrees). A regular hexagon has the corners with an interior angle of 120 degrees. The present disclosure can be applied advantageously to a winding core portion having corner portions of which the interior angle is smaller than that of the regular hexagon.

In the embodiments illustrated, the wire 40 is wound in the aligned bank winding. However, the present disclosure can be applied also to an inductor component in which a wire is wound into a single layer.

Moreover, in the embodiments illustrated, the inductor component 1 includes two terminal electrodes 41 and 42. However, the present disclosure can be also applied to an inductor component having four or more terminal electrodes.

Configurations can be substituted or combined partially with each other between the different embodiments described above.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A core for holding a wire wound therearound to form an inductor component, the core comprising:

a winding core portion extending along a longitudinal axis of the core, wherein the winding core portion has a polygonal cross section that orthogonally intersects the longitudinal axis of the core, the polygonal cross section having four or more corner portions, the winding core portion includes the four or more corner portions, such that the four or more corner portions have an interior angle of from 90 degrees to 120 degrees on the polygonal cross section, at least one of the four or more corner portions has a first round surface and a second round surface that are formed so as to protrude outward, and the first round surface and the second round surface are arranged adjacently to each other in a circumferential direction of the winding core portion, wherein a first flat surface extends from the first round surface toward at least a second one of the four or more corner portions; and a second flat surface extends from the second round surface toward at least a third one of the four or more corner portions, at the at least one of the four or more corner portions, when virtual extensions of adjacent sides intersect at a virtual point of intersection on the polygonal cross section, a distance from the virtual point of intersection to one of the adjacent sides is different from a distance from the virtual point of intersection to the other one of the adjacent sides, and at the at least one of the four or more corner portions, when virtual extensions of adjacent sides intersect at a virtual point of intersection on the polygonal cross section, the inductor component satisfies $0.75D \leq (W \cdot T)^{0.5}$ on the polygonal cross section, where W is the distance from the virtual point of intersection to one of the adjacent sides, T is the distance from the virtual point of intersection to the other one of the adjacent sides, and D is a diameter of the wire.

2. The core according to claim 1, wherein a curvature of the first round surface is different from a curvature of the second round surface.

3. The core according to claim 1, wherein the first round surface and the second round surface are formed at all of the four or more corner portions.

4. The core according to claim 1, wherein the winding core portion includes four corner portions that are a first corner portion, a second corner portion, a third corner portion, and a fourth corner portion, on the polygonal cross section, the first corner portion is positioned diagonally opposite to the third corner portion and the second corner portion is positioned diagonally opposite to the fourth corner portion, and the first round surfaces and the second round surfaces are arranged circumferentially around the winding core portion in the following order: the first round surface of the first corner portion, the second round surface of the first corner portion, the second round surface of the second corner portion, the first round surface of the second corner portion, the first round surface of the third corner portion, the second round surface of the third corner portion, the second round surface of the fourth corner portion, and the first round surface of the fourth corner portion.

5. The core according to claim 1, the core further comprising:

a first flange disposed at a first axial end of the winding core portion;

a second flange disposed at a second axial end of the winding core portion, the second axial end being opposite to the first axial end;

a first terminal electrode disposed at the first flange; and a second terminal electrode disposed at the second flange.

6. An inductor component, comprising:

the core according to claim 5; and a wire, wherein the wire is wound around the winding core portion with the wire being in contact with the first round surface and the second round surface formed at the at least one of the four or more corner portions, the wire having a first end and a second end being opposite to the first end, and the first end is connected to the first terminal electrode and the second end is connected to the second terminal electrode.

7. The inductor component according to claim 6, wherein the wire is wound around the core at least partly into multiple layers.

8. A core for holding a wire wound therearound to form an inductor component, the core comprising:

a winding core portion extending along a longitudinal axis of the core, wherein the winding core portion has a polygonal cross section that orthogonally intersects the longitudinal axis of the core, the polygonal cross section having four or more corner portions, the winding core portion includes the four or more corner portions, such that the four or more corner portions have an interior angle of from 90 degrees to 120 degrees on the polygonal cross section, at least one of the four or more corner portions has a first round surface and a second round surface that are formed so as to protrude outward, and the first round surface and the second round surface are arranged adjacently to each other in a circumferential direction of the winding core portion, wherein a first flat surface extends from the first round surface toward at least a second one of the four or more corner portions; and a second flat surface extends from the second round surface toward at least a third one of the four or more corner portions, at the at least one of the four or more corner portions, when virtual extensions of adjacent sides intersect at a virtual point of intersection on the polygonal cross section, a distance from the virtual point of intersection to one of the adjacent sides is different from a distance from the virtual point of intersection to the other one of the adjacent sides, and at the at least one of the four or more corner portions, when virtual extensions of adjacent sides intersect at a virtual point of intersection on the polygonal cross section, the inductor component satisfies $(W \cdot T)^{0.5} \leq 2D$ on the polygonal cross section, where W is the distance from the virtual point of intersection to one of the adjacent sides, T is the distance from the virtual point of intersection to the other one of the adjacent sides, and D is the diameter of the wire.

9. A method of manufacturing the core according to claim 4, the method comprising:

providing a die, an upper punch, and a lower punch;

forming a compact by pressing a ceramic powder, the compact being formed into the core;

firing the compact; and polishing the fired compact, wherein the forming the compact includes pressing the ceramic powder filled in a cavity of the die by moving the upper punch and the lower punch closer to each other with the ceramic powder interposed therebetween, inside the cavity, the die includes a first molding face that serves to form a first side surface extending between the first corner portion and the second corner portion of the winding core portion and also includes a second molding face that serves to form a second side surface extending between the third corner portion and the fourth corner portion of the winding core portion, the upper punch includes a third molding face that serves to form an upper surface extending between the first corner portion and the fourth corner portion of the winding core portion, at the first corner portion, the third molding face includes a face that serves to form a first shoulder that is a portion to be formed into the second round surface and a first concave face that serves to form the first round surface at a position inside the first shoulder, at the fourth corner portion, the third molding face also includes a face that serves to form a fourth shoulder that is a portion to be formed into the second round surface and a fourth concave face that serves to form the first round surface at a position inside the fourth shoulder, the lower punch includes a fourth molding face that serves to form a lower surface extending between the second corner portion and the third corner portion of the winding core portion, at the second corner portion, the fourth molding face includes a face that serves to form a second shoulder that is a portion to be formed into the second round surface and a second concave face that serves to form the first round surface at a position inside the second shoulder, at the third corner portion, the fourth molding face also includes a face that serves to form a third shoulder that is a portion to be formed into the second round surface and a third concave face that serves to form the first round surface at a position inside the third shoulder, the compact obtained by the forming the compact has the first shoulder and the first round surface that are formed at the first corner portion, the second shoulder and the first round surface that are formed at the second corner portion, the third shoulder and the first round surface that are formed at the third corner portion, and the fourth shoulder and the first round surface that are formed at the fourth corner portion, and the polishing the fired compact includes forming the second round surfaces respectively at the first shoulder, the second shoulder, the third shoulder, and the fourth shoulder by polishing the first shoulder, the second shoulder, the third shoulder, and the fourth shoulder.

10. The method of manufacturing the core according to claim 9, wherein at a position outside the first concave face for forming the first round surface at the first corner portion, the third molding face includes a first flat face that serves to form the first shoulder, at a position outside the fourth concave face for forming the first round surface at the fourth corner portion, the third molding face also includes a fourth flat face that serves to form the fourth shoulder, at a position outside the second concave face for forming the first round surface at the second corner portion, the fourth molding face includes a second flat face that serves to form the second shoulder, and at a position outside the third concave face for forming the first round surface at the third corner portion, the fourth molding face also includes a third flat face that serves to form the third shoulder.

11. The method of manufacturing the core according to claim 9, wherein the compact obtained by the forming the compact is in a state in which a fin protrudes at at least one of edges of the first shoulder, the second shoulder, the third shoulder, and the fourth shoulder, the fin being made of extra ceramic powder extruded into gaps between the die and the upper and lower punches, and the polishing the fired compact includes removing the fin.

12. The method of manufacturing the core according to claim 9, wherein the polishing the fired compact includes polishing by using barrel finishing.

13. The core according to claim 1, wherein the wire is wound around the core at least partly into multiple layers.

14. The method of manufacturing the core according to claim 10, wherein the compact obtained by the forming the compact is in a state in which a fin protrudes at at least one of edges of the first shoulder, the second shoulder, the third shoulder, and the fourth shoulder, the fin being made of extra ceramic powder extruded into gaps between the die and the upper and lower punches, and the polishing the fired compact includes removing the fin.

* * * * *